(12) United States Patent
Elserougi et al.

(10) Patent No.: US 9,654,023 B2
(45) Date of Patent: May 16, 2017

(54) DC SIDE FAULT ISOLATOR FOR HIGH VOLTAGE DC CONVERTORS

(71) Applicants: Ahmed Elserougi, Doha (QA); Ayman Abdel-Khalik, Houston, TX (US); Ahmed Massoud, Doha (QA); Shehab Ahmed, Doha (QA)

(72) Inventors: Ahmed Elserougi, Doha (QA); Ayman Abdel-Khalik, Houston, TX (US); Ahmed Massoud, Doha (QA); Shehab Ahmed, Doha (QA)

(73) Assignee: QATAR FOUNDATIONFOR EDUCATION, SCIENCE AND COMMUNICTY DEVELOPMENT, Doha (QA)

( * ) Notice: Subject to any disclaimer, the term of this patent is extended or adjusted under 35 U.S.C. 154(b) by 0 days.

(21) Appl. No.: 15/113,431

(22) PCT Filed: Jan. 27, 2015

(86) PCT No.: PCT/US2015/013041
§ 371 (c)(1),
(2) Date: Jul. 21, 2016

(87) PCT Pub. No.: WO2015/113033
PCT Pub. Date: Jul. 30, 2015

(65) Prior Publication Data
US 2017/0033708 A1 Feb. 2, 2017

Related U.S. Application Data

(60) Provisional application No. 61/932,223, filed on Jan. 27, 2014.

(51) Int. Cl.
*H02M 7/155* (2006.01)

(52) U.S. Cl.
CPC .................................. *H02M 7/1552* (2013.01)

(58) Field of Classification Search
CPC .................................................... H02M 7/1552
See application file for complete search history.

(56) References Cited

U.S. PATENT DOCUMENTS

| 8,570,779 B2* | 10/2013 | Dommaschk | H02M 1/32 361/57 |
| 2013/0063995 A1* | 3/2013 | Norrga | H02M 1/32 363/125 |

(Continued)

FOREIGN PATENT DOCUMENTS

| CN | 102801140 | 11/2012 |
| CN | 202817721 | 3/2013 |

(Continued)

OTHER PUBLICATIONS

Yalong Li et al., "Analysis on Fault Current Stress for Power Switches in Modular Multilevel Converter Based DC System", CURENT 2013 Site Visit and Industry Conference, UTK, Knoxville, (2013), 5 pages.

*Primary Examiner* — Jue Zhang
(74) *Attorney, Agent, or Firm* — Richard C. Litman

(57) ABSTRACT

The direct current (DC) side fault isolator for high voltage direct current (HVDC) converters (10) includes a first set of double thyristor switches (12) connected across the line-to-line voltage terminals between first and second phases of alternating current (AC) terminals of a HVDC converter (14), and a second set of double thyristor switches (12) connected across the line-to-line voltage between the second phase and a third phase of the AC terminals of the HVDC converter (14). In use, the first and second sets of double thyristor switches (12) separate the HVDC converter (10)

(Continued)

from an external power grid (18) during direct current (DC) side faults by turning on these thyristors (12).

15 Claims, 15 Drawing Sheets

(56) References Cited

U.S. PATENT DOCUMENTS

| | | | | |
|---|---|---|---|---|
| 2013/0208514 A1* | 8/2013 | Trainer | ............... | H02J 3/36 |
| | | | | 363/35 |
| 2013/0208521 A1* | 8/2013 | Trainer | ............... | H02J 3/36 |
| | | | | 363/126 |
| 2014/0002933 A1* | 1/2014 | Gao | ............ | H02M 1/32 |
| | | | | 361/18 |
| 2015/0116881 A1* | 4/2015 | Burnett | ............ | H01H 9/542 |
| | | | | 361/93.1 |

FOREIGN PATENT DOCUMENTS

| | | |
|---|---|---|
| JP | 5-328594 | 12/1993 |
| WO | WO 2013/112981 | 8/2013 |
| WO | WO 2013/127462 | 9/2013 |

\* cited by examiner

DC SIDE FAULT ISOLATOR FOR HIGH VOLTAGE DC CONVERTORS

TECHNICAL FIELD

The present invention relates to high voltage direct current (HVDC) converters, and particularly to a DC side fault isolator for HVDC converters for separating the HVDC converter from an external power grid during direct current side faults.

BACKGROUND ART

A high voltage direct current (HVDC) converter converts electric power from high voltage alternating current (AC) to high voltage direct current, or vice-versa. HVDC is used as an alternative to AC for transmitting electrical energy over long distances or between AC power systems of different frequencies. A complete converter station can contain several such converters in series and/or parallel (multi-module HVDC converters).

HVDC converters are divided into two main categories: line-commutated converters and forced-commutated voltage-sourced converters. Line-commutated converters use on-controlled and off-uncontrolled switches; i.e., thyristors. Forced-commutated voltage-source converters (VSCs) use on-controlled and off-uncontrolled devices, namely insulated-gate bipolar transistors (IGBTs).

At present, both the line-commutated and voltage-source technologies are important, with line-commutated converters used mainly where very high capacity and efficiency are needed, and voltage-source converters used mainly for interconnecting weak AC systems, such as connecting large-scale wind power to the grid. The market for HVDC voltage-source converters is growing relatively fast, driven partly by the surge in investment in offshore wind power, with one particular type of converter, the Modular Multi-Level Converter (MMC) emerging as a front-runner, due to its modularity and scalability.

Like the two-level converter and the six-pulse line-commutated converter, a MMC typically can consist of six valves (or "arms"), each connecting one AC terminal to one DC terminal. However, where each valve of the two-level converter can be effectively a high voltage controlled switch consisting of a large number of IGBTs connected in series, each arm of a MMC can be a separate controllable voltage source in its own right. Generally, each MMC arm consists of a number of independent converter sub-modules, each containing its own storage capacitor. In the most common form of the circuit, the half-bridge variant, each sub-module contains two IGBTs connected in series across the capacitor, with the midpoint connection and one of the two capacitor terminals brought out as external connections. Depending on which of the two IGBTs in each sub-module is turned on, the capacitor is either bypassed or connected into the circuit. Each sub-module therefore can act as an independent two-level converter generating a voltage of either 0 or $V_{sm}$ (where $V_{sm}$ is the sub-module capacitor voltage). With a suitable number of sub-modules connected in series, the valve can synthesize a stepped voltage waveform that approximates very closely to a sine-wave and typically contains very low levels of harmonic distortion. The MMC differs from other types of converters in that current typically flows continuously in all six arms of the converter throughout the mains-frequency cycle. As a result, concepts such as "on-state" and "off-state" have no meaning in the MMC. The direct current splits equally into the converter legs and the alternating current splits equally into the upper and lower arm of each phase.

In HVDC systems, limiting fault currents is vital to protect the converter semiconductor devices, which are the most sensitive components in the system. Unfortunately, the VSC and half-bridge MMC are defenseless against DC side faults since their free-wheeling diodes function as an uncontrolled rectifier bridge and feed the DC fault, even if the semiconductor devices are turned off. During the DC fault, the AC side current contribution into DC fault passes through the free-wheeling diodes. As a result, the diodes can be damaged due to the high fault current. This rectification mode of operation is shown in FIGS. 2A and 2B for the two-level VSC and half-bridge MMC, respectively, during a DC side fault.

In FIG. 2A, the DC fault current ($i_F$) in VSC-HVDC systems emanates from the contribution of both the AC grid ($i_{gc}$) along with the discharging current of the DC-link capacitor ($i_{dis}$). The discharging current has a large first peak that decays with time. In a MMC-HVDC system, the common DC-link capacitor is not utilized, which helps suppress the discharge current. However, the fault current contribution from the AC side ($i_{gc}$) still exists; i.e., there is no segregation between the DC and AC sides during DC faults in this topology. A solid state DC circuit breaker can be used to overcome the DC side problems in HVDC converters, however its main drawbacks are generally cost and relatively high conduction losses.

AC circuit breakers (ACCBs) can be used to achieve the required DC protection, but the free-wheeling diodes used with IGBTs are fast recovery diodes characterized by low surge current withstand capability. These free-wheeling diodes should withstand the fault current until the circuit breaker trips. Thus, there can be a risk in depending on ACCB protection alone, since the semiconductor devices can be damaged due to high fault currents. To enhance the reliability of AC circuit breakers in DC protection, converter embedded devices can be used in conjunction with the AC circuit breakers.

In the Single Thyristor Switch Scheme (STSS), a single thyristor switch is connected in each sub-module of the MMC, as shown in FIG. 3A. The thyristor is used to share the fault current with a free-wheeling diode or, in the other words, to reduce the overcurrent stresses on semiconductor devices pending the tripping of the ACCBs. This can be realized by turning the thyristors on when a DC side fault is detected. The thyristor has a higher capability for withstanding the surge current compared to the free-wheeling diode. As a result, most of the fault current flows through the thyristor and not through the diode.

Because the STSS protects the semiconductor devices but typically cannot prevent the grid current contribution into the DC fault, an evolution was later introduced to address this shortcoming. The Double Thyristor Switch Scheme (DTSS) can be used to protect the semiconductor devices by sharing the current with the free-wheeling diodes and simultaneously prevent the grid current contribution, which can allow the DC-link current to freely decay. In this scheme, a double thyristor switch (back-to-back thyristor) is connected across the semiconductor devices, as shown in FIG. 3B. However, the main drawbacks of this method generally are: both thyristors have to withstand high dv/dt during normal operation (high dv/dt can produce capacitive displacement current in the device, which can cause undesirable turn on); a snubber circuit is also typically essential to prevent damage due to overvoltage spikes and dv/dt; the free-wheeling diodes are still sharing the fault current with the thyristors;

and the complexity of implementing an embedded double thyristor switch in each MMC sub-module.

The STSS and DTSS can also be applied to the VSC configuration by connecting the thyristor across each semiconductor device, as shown in FIGS. 3C and 3D, respectively. Given the above drawbacks, it would be desirable to provide a protection scheme for HVDC converters (classical two-level VSC as well as half-bridge MMC) in which, instead of connecting the double thyristor switches across the semiconductor devices, they are combined and connected across the AC output terminals of the HVDC converter.

Thus, a DC side fault isolator for HVDC converters solving the aforementioned problems is desired.

DISCLOSURE OF INVENTION

The direct current (DC) side fault isolator for high voltage direct current (HVDC) converters includes a first set of double thyristor switches connected across the line-to-line voltage terminals between first and second phases of alternating current (AC) terminals of a HVDC converter, and a second set of double thyristor switches connected across the line-to-line voltage terminals between the second phase and a third phase of the AC terminals of the HVDC converter. In use, the first and second sets of double thyristor switches separate the HVDC converter from an external power grid during direct current side faults by turning on these thyristors. In the case where the HVDC converter is a two-level voltage-source converter, the first and second sets of double thyristor switches each include three double thyristor switches. In the case where the HVDC converter is a half-bridge modular multilevel converter, the first and second sets of double thyristor switches each include 3n double thyristor switches, where n is a number of sub-modules per arm of the half-bridge modular multilevel converter.

These and other features of the present invention will become readily apparent upon further review of the following specification and drawings.

BRIEF DESCRIPTION OF THE DRAWINGS

Similar reference characters denote corresponding features consistently throughout the attached drawings.

BEST MODE(S) FOR CARRYING OUT THE INVENTION

Figure 1:
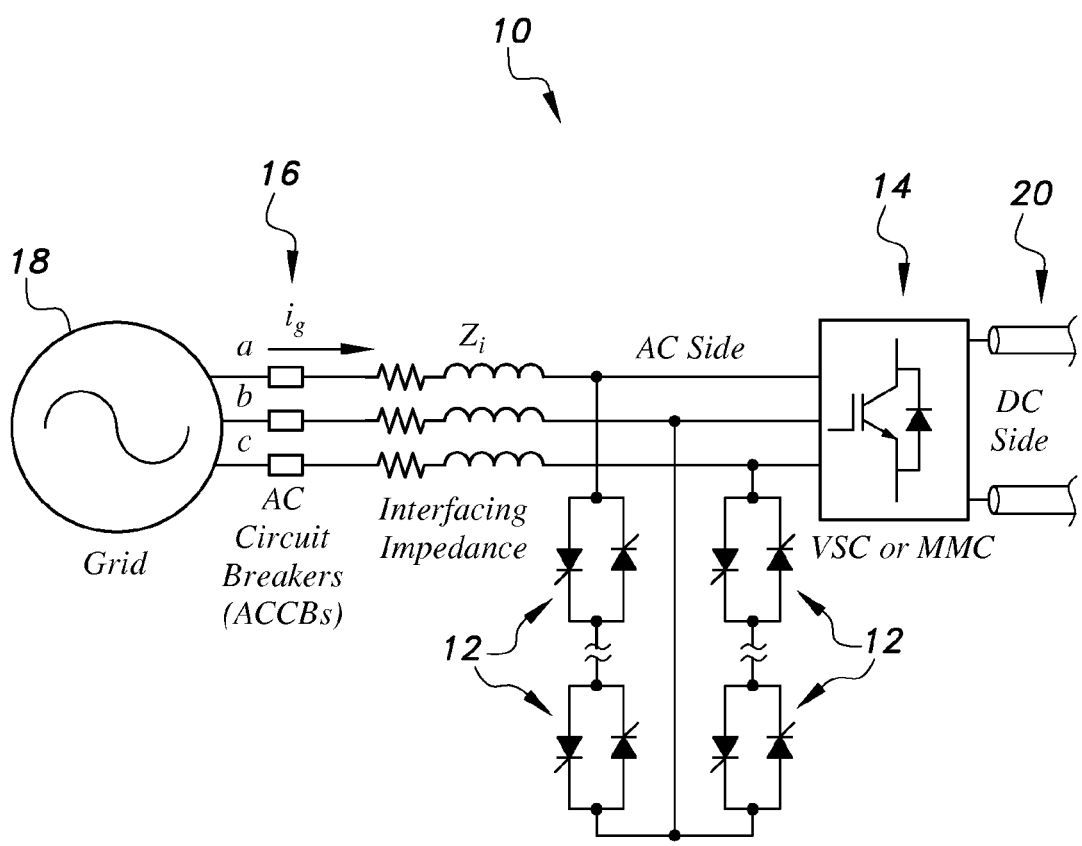
FIG. 1 is a schematic diagram of a DC side fault isolator for HVDC converters according to the present invention.

As shown in FIG. 1, in the DC side fault isolator for high voltage DC (HVDC) converters 10, double thyristor switches 12 are combined and connected across the AC output terminals of a HVDC converter 14 (which can be either a VSC or MMC). Normally, the thyristors 12 are turned off. When a DC side fault is initiated, the thyrsistors 12 are turned on to segregate the HVDC converter from the AC side. From fault inception until the tripping of the ACCBs 16, the DC side fault isolator for HVDC converters 10 can provide the needed protection for the semiconductor devices of the HVDC converter 14 as well as complete segregation between the AC grid 18 and the DC side 20, i.e., the grid current contribution is eliminated or substantially eliminated.

Figure 4A:
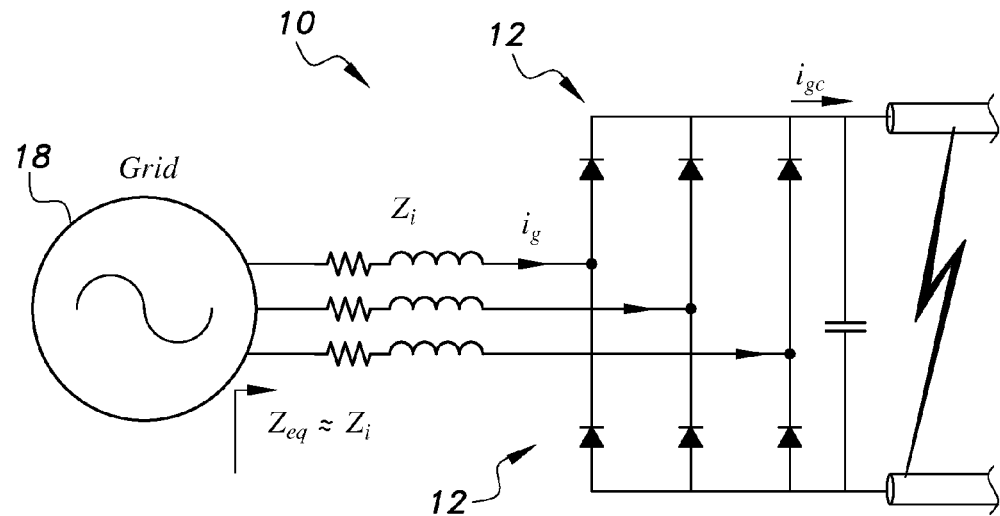
FIG. 4A schematically illustrates the effect of thyristors firing on the equivalent impedance, as seen by the grid, in a VSC configuration before thyristor firing.
Figure 4B:
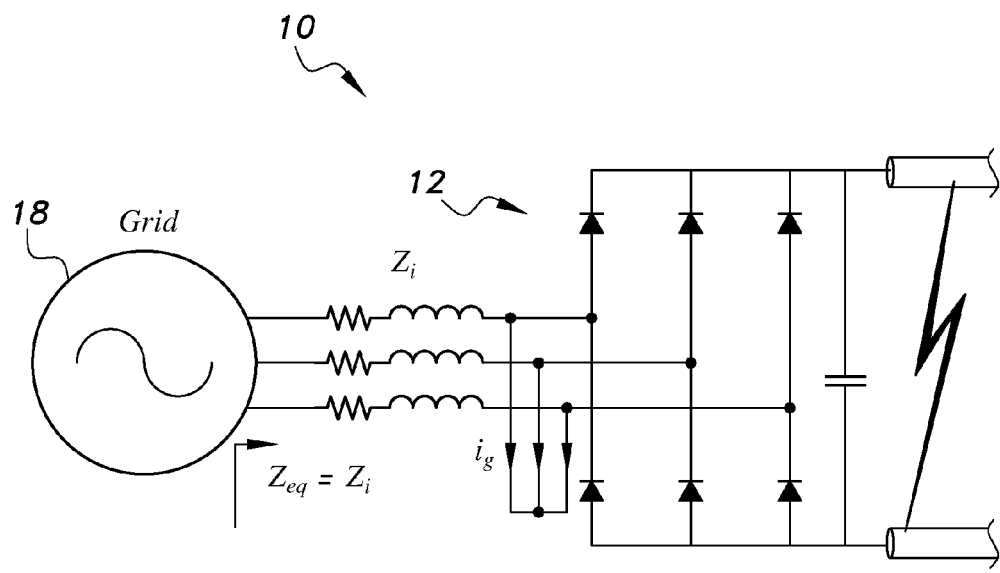
FIG. 4B schematically illustrates the effect of thyristors firing on the equivalent impedance, as seen by the grid, in a VSC configuration after thyristor firing.

In the case of the conventional two-level VSC, the equivalent impedance seen by the grid 18 during the DC side fault before and after firing the thyristors 12 is the same, which is equal to the impedance of the interfacing impedance (4), as shown in FIGS. 4A and 4B. FIG. 4A illustrates the effect of thyristors 12 on the equivalent impedance seen by grid 18 before the firing of the thyristors 12, and FIG. 4B shows the effect after firing the thyristors 12. Thus, by firing the thyristors 12, the needed segregation can be achieved without increasing the magnitude of AC fault currents.

Figure 5A:
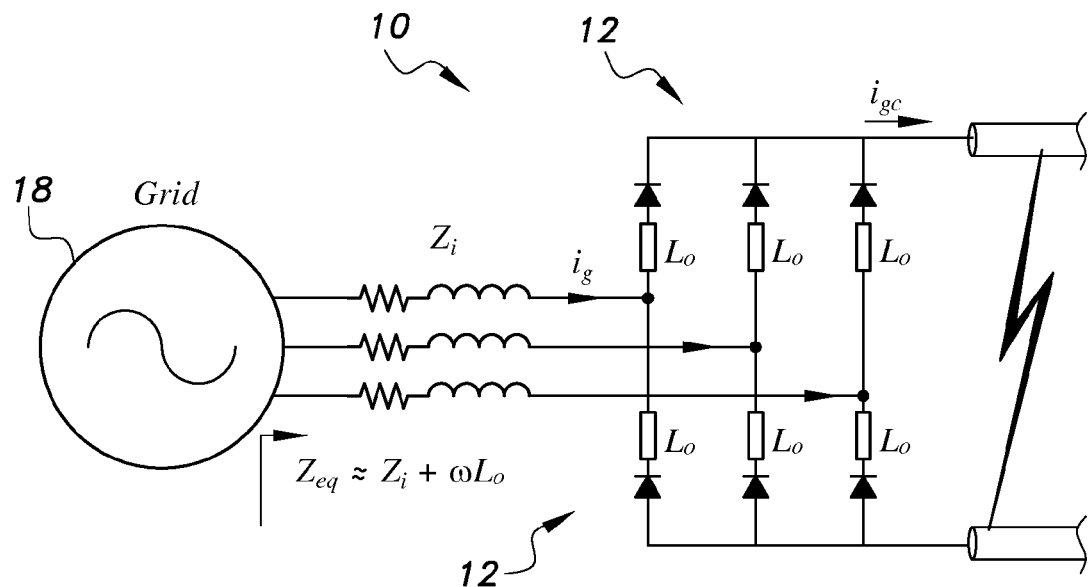
FIG. 5A schematically illustrates the effect of thyristors firing on the equivalent impedance, as seen by the grid, in a MMC configuration before thyristor firing.
Figure 5B:
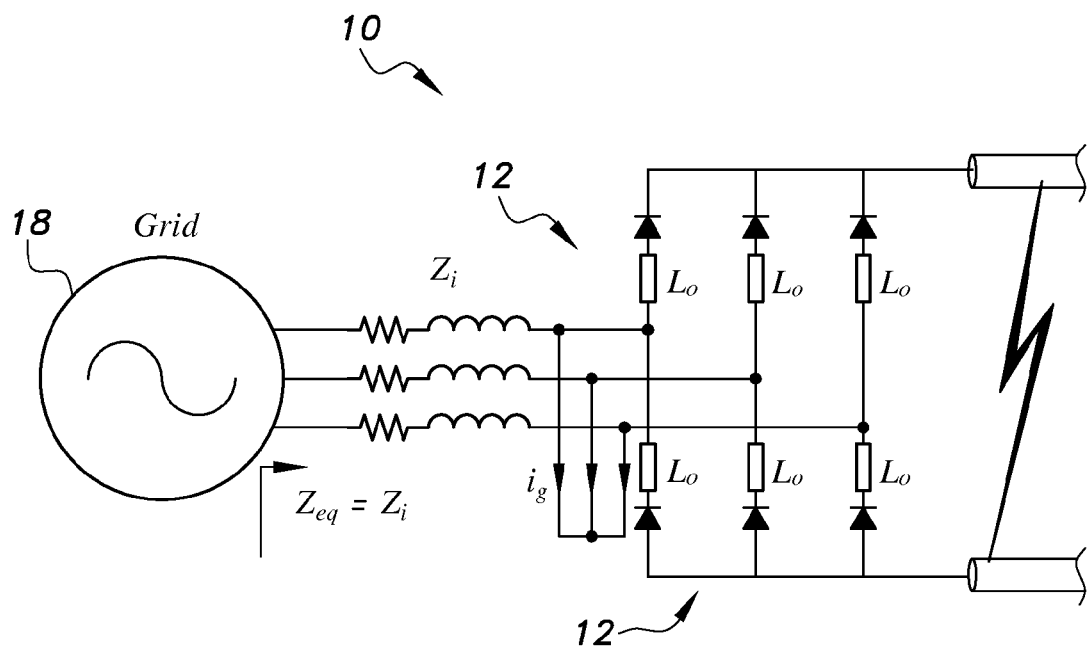
FIG. 5B schematically illustrates the effect of thyristors firing on the equivalent impedance, as seen by the grid, in a MMC configuration after thyristor firing.

On the other hand, in the MMC case, the equivalent impedance during a DC side fault after firing the thyristors (FIG. 5B) is lower than its value before firing the thyristors (FIG. 5A) because the arm inductors $L_o$ are no longer part of the circuit during faults when utilizing the DC side fault isolator for HVDC converters 10, as shown in FIG. 5B. The main two functions of the arm inductors $L_o$ are suppression of circulating currents and limiting fault currents. When the DC side fault isolator for HVDC converters 10 is utilized, the latter is typically no longer a need since the AC current magnitude is not significantly affected during faults, thus a lower value inductor can suffice.

By turning on the combined thyristors 12 on the AC side, the following benefits can be gained: complete segregation between the AC grid 18 and converter 14 during DC faults (there is no AC current contribution into the DC fault; i.e., the same AC current magnitudes exist before and after firing of the thyristors 12); the AC currents will not be affected by turning the thyristors 12 on; i.e., the same AC current magnitudes exist before and after firing of the thyristors 12; and the DC-link current will decay freely to zero. Once the fault current is zero, the DC side should be disconnected from the DC terminals of the converter 14. At this instant, the thyristors 12 can be turned off and the AC grid current will decrease automatically to zero, since the uncontrolled bridge rectifier is connected to an open circuit after disconnecting the DC side. However, if the time needed for a fault current to decay to zero is larger than the tripping time of ACCBs 16 (at least three cycles), the ACCBs 16 will disconnect the system from the grid 18 to protect the interfacing transformer and the thyristor switches 12, while the DC-link current continues its decay. Additionally, the system 10 provides lower dv/dt across thyristors 12, and further, no relatively complicated DC circuit breaker is typically needed in conjunction with this topology, since the DC-link current is able to decay freely to zero.

Thyristors are often subjected to a high rate of voltage change during operation. This produces a capacitive displacement current in the device, which can cause undesirable turn on. This is known as the dv/dt effect, and the maximum dv/dt for which the device maintains its blocking capability is known as its dv/dt capability. Below, a comparison between the thyristors' dv/dt stresses for the conventional STSS and DTSS and the present system is provided.

In STSS, the thyristor is connected across the semiconductor device. During normal operating conditions, the voltage across semiconductor devices changes between 0 and $V_{sw}$. In the case of a VSC, $V_{sw}$, is equal to the DC-link voltage ($V_{dc}$), while it is equal to the voltage of each sub-module's capacitor ($V_{dc}/n$) in the case of the MMC, where n is the number of sub-modules per arm. The dv/dt on the single thyristor switch for the VSC and MMC are given by equations (1) and (2), respectively, as follows:

$$\left.\frac{dv}{dt}\right|_{Single, VSC} = \pm \frac{V_{sw}}{T_{on/off}} = \pm \frac{V_{dc}}{T_{on/off}} \quad (1)$$

$$\left.\frac{dv}{dt}\right|_{Single, MMC} = \pm \frac{V_{dc}/n}{T_{on/off}}, \quad (2)$$

where $T_{on/off}$ is the time needed for the semiconductor device to change its state from ON to OFF, or vice versa. Six and 6n single thyristor switches with a voltage rating of $V_{dc}$, and $V_{dc}/n$ are typically needed for the VSC and MMC configurations, respectively.

In the DTSS, a back-to-back thyristor switch is also connected across each semiconductor device; i.e., it will have the same dv/dt as the STSS, as given below in equations (3) and (4), as follows:

$$\left.\frac{dv}{dt}\right|_{Double, VSC} = \pm \frac{V_{sw}}{T_{on/off}} = \pm \frac{V_{dc}}{T_{on/off}}, \quad (3)$$

$$\left.\frac{dv}{dt}\right|_{Double, MMC} = \pm \frac{V_{dc}/n}{T_{on/off}}. \quad (4)$$

Similarly, six and 6n double thyristor switches with a voltage rating of $V_{dc}$, and $V_{dc}/n$ are typically needed for the VSC and MMC configurations, respectively.

In the present system, the back-to-back thyristors used in the DTSS are combined and divided into two groups (i.e., there are 3 and 3n back-to-back thyristor switches 12 per group for the VSC and MMC, respectively). Each group is connected across the AC terminals of the converter 14, as shown in FIG. 1. As a result, the converter line voltage is applied across each group. In the conventional VSC case, there is a voltage step of $\pm V_{dc}$ in each change in converter line voltage. Since the voltage step is shared between three series back-to-back thyristor switches, the corresponding dv/dt across each thyristor in the present system can be calculated or determined from equation (5) below, as follows:

$$\left.\frac{dv}{dt}\right|_{Present\ System,\ VSC} = \pm \frac{V_{dc+}/3}{T_{on/off}}. \quad (5)$$

Comparing equations (3) and (5) shows that the thyristor dv/dt decreased by 66% in the present system. Additionally, thyristors with lower voltage ratings can be used. During normal conditions, the highest instantaneous value of line voltage $V_{dc}$ is shared between three series back-to-back thyristor switches, which means a thyristor with a voltage rating of $V_{dc}/3$ can be used, i.e., the voltage rating of thyristors can also be decreased by 66% with the present system, for example.

In the MMC case, there is a voltage step of $\pm V_{sw}$ with each change in converter line voltage. Since the voltage step is shared between 3n series back-to-back thyristor switches, the corresponding dv/dt across each thyristor of the present system is given by equation (6), as follows:

$$\left.\frac{dv}{dt}\right|_{Present\ System,\ MMC} = \pm \frac{V_{sw}/3n}{T_{on/off}} = \pm \frac{V_{dc}/3n^2}{T_{on/off}}. \quad (6)$$

Figure 6A:
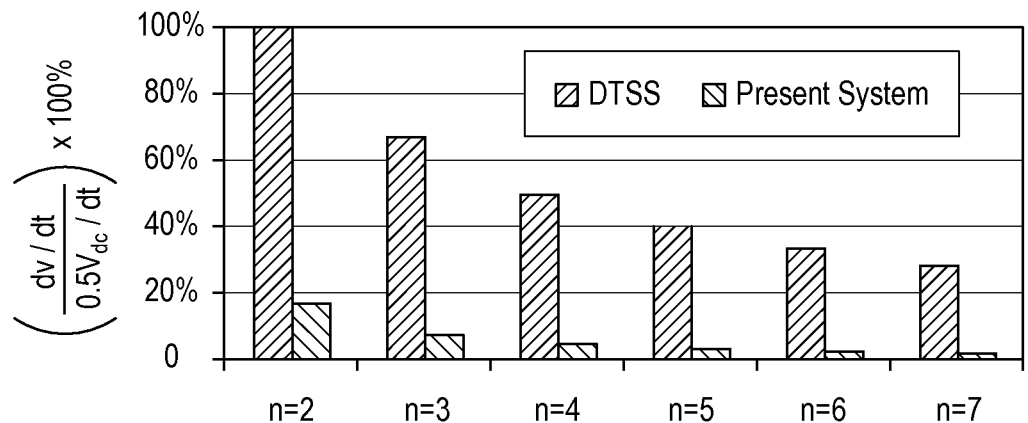
FIG. 6A is a chart illustrating the effect of the DC side fault isolator for HVDC converters according to the present invention on dv/dt in a MMC configuration for differing numbers of sub-modules per converter arm, particularly showing thyristor dv/dt stresses compared against those of DTSS.
Figure 6B:
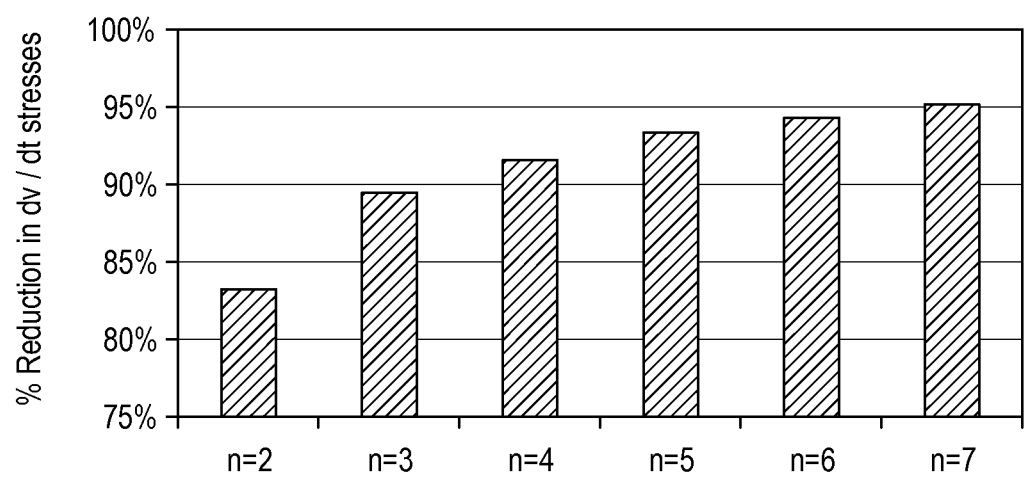
FIG. 6B is a chart illustrating the effect of the DC side fault isolator for HVDC converters according to the present invention on dv/dt in a MMC configuration for differing numbers of sub-modules per converter arm, particularly showing percentage reduction in dv/dt stresses.

Comparing equations (4) and (6) shows that the dv/dt for each thyristor decreased by $$\frac{3n-1}{3n} \times 100\%$$

in the present system. Based on equations (4) and (6), FIG. 6A shows the variation of dv/dt stresses of each thyristor with the number of sub-modules per arm n, considering both DTSS and the present system. FIG. 6B shows the corresponding percentage reduction in dv/dt stresses for each thyristor when the present system is applied. The highest instantaneous value of line voltage $V_{dc}$ is shared between 3n series back-to-back thyristor switches, which means a thyristor with a voltage rating of $V_{dc}/3n$ can be used instead of $V_{dc}/n$, i.e., the voltage rating of thyristors also can decrease by 66% in the MMC configuration, for example.

Figure 7A:
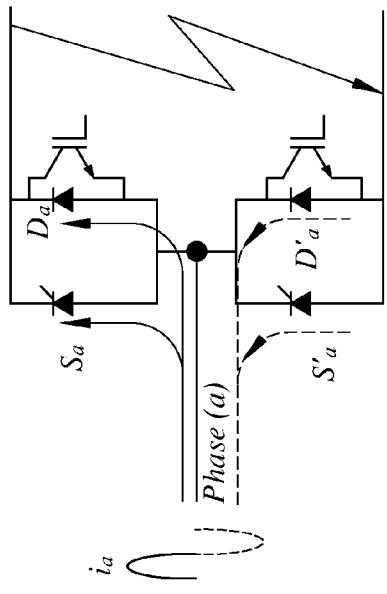
FIG. 7A schematically illustrates AC current paths during a DC side fault in a fault protection system using ACCBs only.

FIGS. 7A, 7B, 7C and 7D show per-phase paths of AC current during DC side faults for different types of DC protection schemes (ACCBs only, STSS, DTSS, and the present system, respectively). FIG. 7A shows that if ACCBs are used for protection during DC side faults, the full AC current passes through the free-wheeling diodes, which can increase the probability of damage of the semiconductor devices. The diode currents in this scheme are given by equation (7), as follows:

$$i_{D_a} = i_a^+, i_{D'_a} = i_a^{31}, \quad (7)$$

where $i_a^+$ and $i_a^-$ are the positive and negative currents of phase "a", respectively.

In the STSS, the per-phase AC current will be shared between the thyristors and diodes (FIG. 7B) and is split into the terms in equation (8), as follows:

$$i_a^+ = i_{D_a} + i_{S_a}, i_a^{31} = i_{D'_a} + i_{S'_a}. \quad (8)$$

In the DTSS, the per-phase AC current will be shared between the thyristors and diodes (FIG. 7C) and can be divided into three terms, as in equation (9), as follows:

$$i_a^+ i_{D_a} + i_{S'_{a2}}, i_a^- i_{D'_a} + i_{S'_{a1}} + i_{S_{a2}}. \quad (9)$$

Figure 7C:
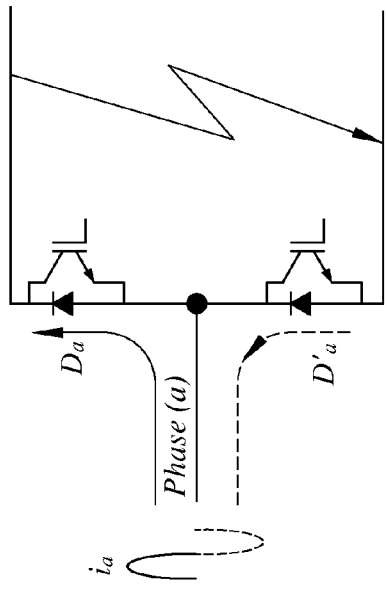
FIG. 7C schematically illustrates AC current paths during a DC side fault in a fault protection system using DTSS.
Figure 7B:
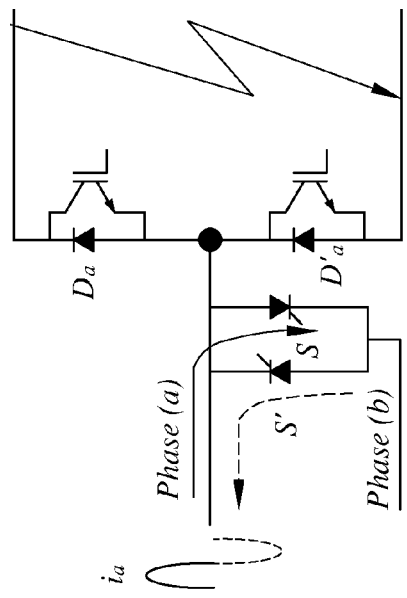
FIG. 7B schematically illustrates AC current paths during a DC side fault in a fault protection system using STSS.
Figure 7D:
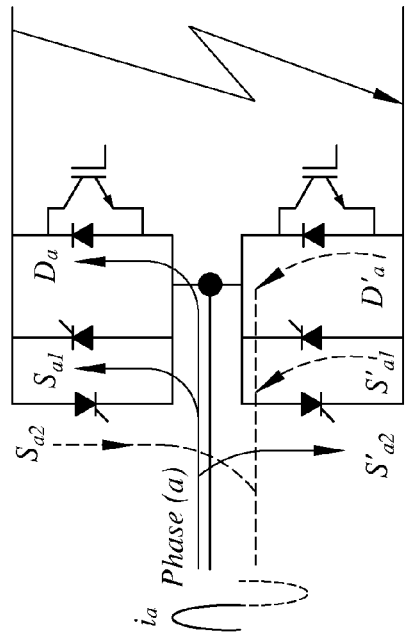
FIG. 7D schematically illustrates AC current paths during a DC fault in a side fault protection system using the DC side fault isolator for HVDC converters according to the present invention.

In the present method, the full AC current passes through the thyristors, as shown in FIG. 7D.

The steady state currents of thyristors and diodes during a DC fault in the present system are given by equations (10) and (11), respectively, as follows:

$$i_S = i_a^{\circ}, i_{S'} = i_a^-, \quad (10)$$

$$i_{D_a} = 0, {}_{D'_a} 0. \quad (11)$$

It is clear that the thyristors associated with the present system can have a higher current rating because they carry the full AC current. On the other hand, the involved thyristors in the STSS and DTSS are sharing the current with the free-wheeling diodes, as shown in FIGS. 7B and 7C, respectively, thus lower current rating devices typically will be sufficient (approximately half of the current). From the above, it can be seen that the present system requires thyristors with lower voltage ratings (33% compared to other schemes), and also requires thyristors with a higher current rating (200% compared to other schemes). For example, if DTSS is applied in the VSC configuration, six double thyristor switches typically will be needed with voltage and current ratings of $V_{dc}$ and approximately $0.5I_{sc}$, where $I_{sc}$ is the magnitude of AC current during the DC fault. On the other hand, six double thyristor switches typically will be needed for the present system with voltage and current ratings of $V_{dc}/3$ and $I_{sc}$, respectively, for example.

The following illustrates the DC side performance during DC faults in VSC-HVDC, as well as in MMC-HVDC systems. DTSS and the present system provide complete or substantially complete segregation between the AC and DC sides during DC side faults, however DC side protection with ACCBs only, or STSS, typically does not provide this segregation. In the VSC with grid contributions (STSS or AC breakers only), when the DC fault occurs, the DC fault current goes through three different stages, which can be summarized as follows: the capacitor discharge stage, in which the DC-link capacitor starts discharging, and the discharge current has a high peak and decays with the time (natural response); the diode free-wheel stage, which is initiated as the DC fault commutates to the to converter free-wheeling diodes when the DC-link voltage reaches zero and the cable inductance drives the current around the free-wheeling path (each converter leg carries one third of the fault current). At this stage, the initial diode currents are high which can damage them, then the current decays with time; and the grid-side current feeding stage (forced response), in which the DC-link capacitor and cable inductor have a forced current source response, where the grid current contribution into the DC fault ($i_{gc}$) is the summation of the positive three-phase fault currents.

In the case without grid contributions (the DTSS or the present system or present method), the DC fault current will behave as in the capacitor discharge and diode free-wheel stages above. This allows the DC-link current to decay freely to zero (DC fault current suppression capability).

Figure 2A:
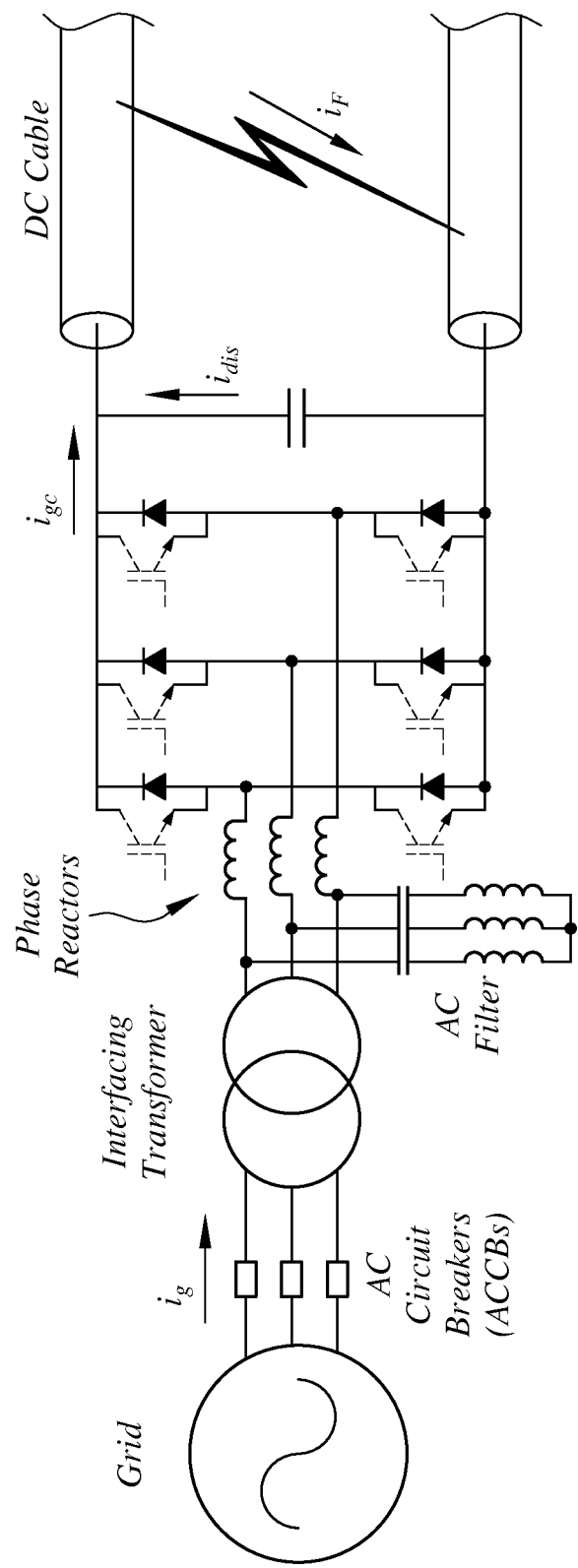
FIG. 2A schematically illustrates a VSC HVDC converter during a DC side fault.
Figure 2B:
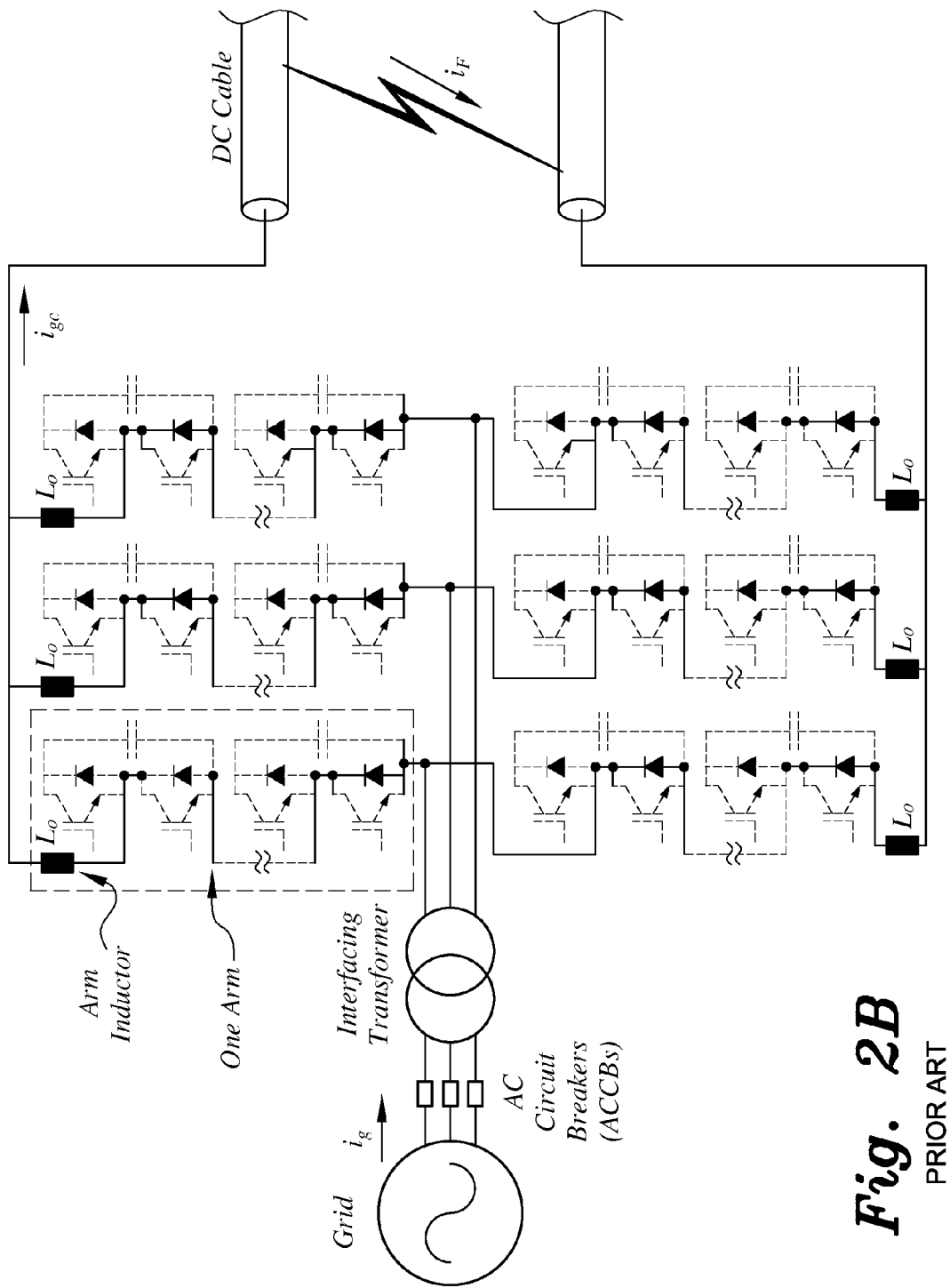
FIG. 2B schematically illustrates a MMC HVDC converter during a DC side fault.
Figure 3A:
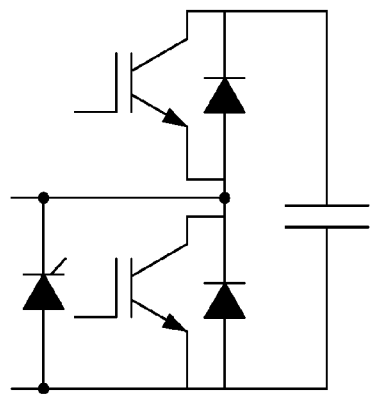
FIG. 3A schematically illustrates an STSS scheme for a MMC sub-module.
Figure 3B:
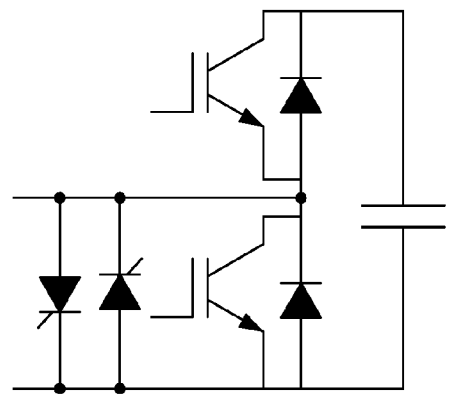
FIG. 3B schematically illustrates a DTSS scheme for a MMC sub-module.
Figure 3C:
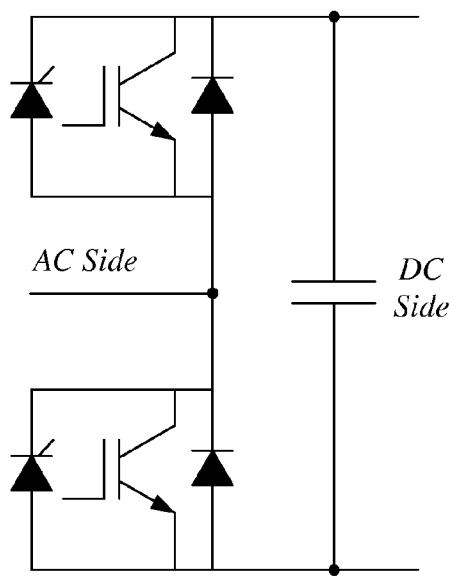
FIG. 3C schematically illustrates an STSS scheme for one leg of a VSC topology.
Figure 3D:
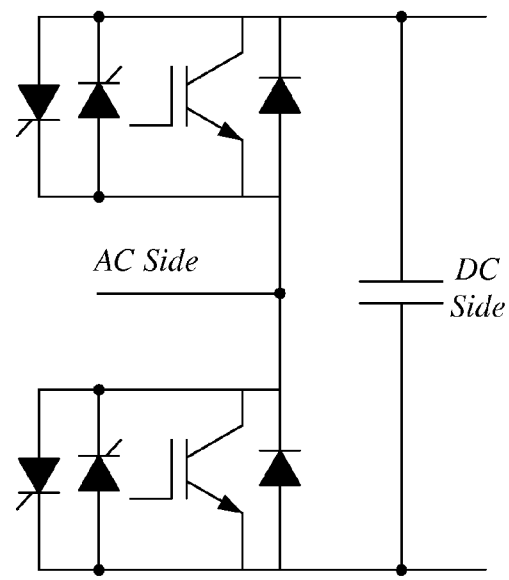
FIG. 3D schematically illustrates a DTSS scheme for one leg of a VSC topology.

For the MMC, due to the MMC's particular topology, the DC link capacitors are no longer connected to the DC side during DC faults (as shown in FIG. 2B); i.e., no discharge currents are flowing under DC fault conditions. Without grid contributions (the DTSS or the present system or present method), upon fault inception, the diode free-wheeling stage is initiated as the cable inductance drives the current around the freewheeling path, dissipating its energy in the cable resistance. It should be noted that there are three freewheeling paths and that each one carries one-third of the fault current and consists of two free-wheeling diodes in series with two arm inductors. The current will have an exponential current decay until reaching zero (DC fault current suppression capability).

With grid contribution (STSS or ACCBs only), the DC fault current will behave as in the grid-side current feeding stage, i.e., the DC-link current will increase to a value equal to the summation of the positive three-phase fault currents after incidence of the fault.

Figure 8:
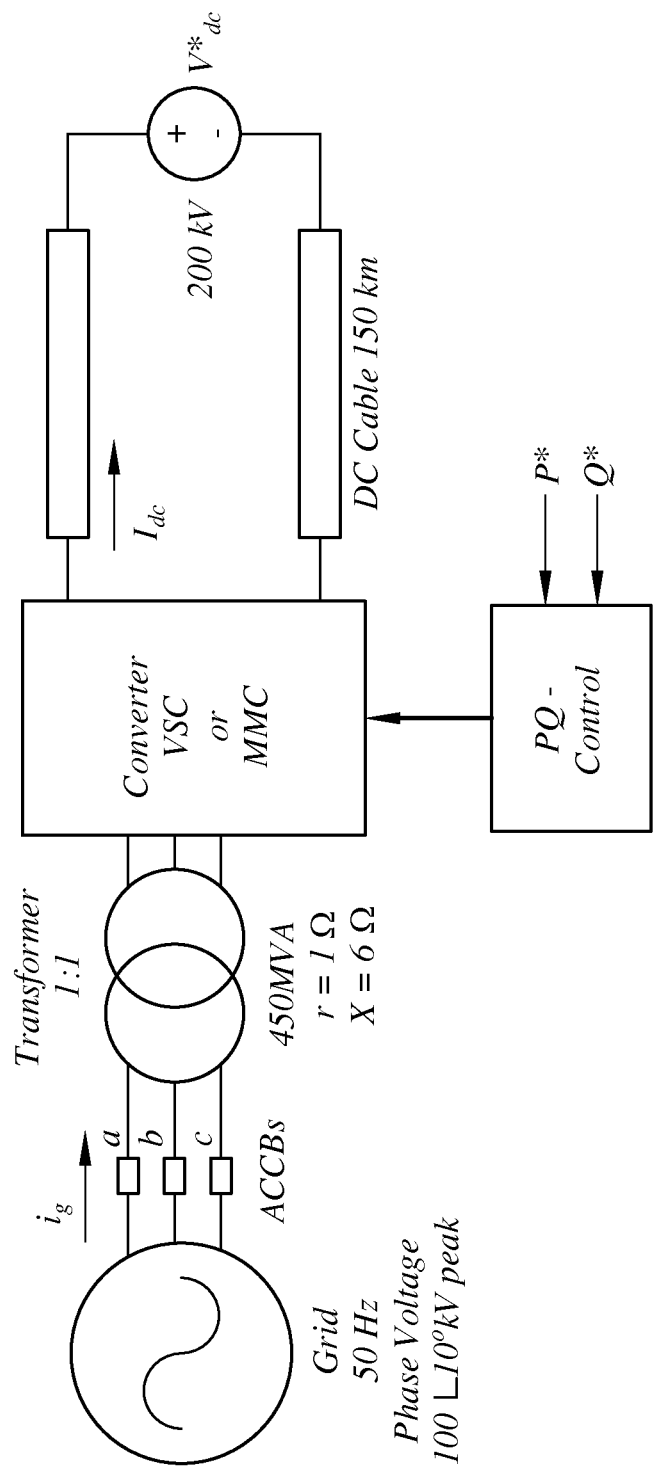
FIG. 8 is a block diagram showing a simulated model of an HVDC converter for simulating the DC side fault isolator for HVDC converters according to the present invention.

A simulation study was conducted and the block diagram for the simulated HVDC system is shown in FIG. 8. The parameters of the HVDC system are given below in Table 1. Two simulation models were developed, namely, one for the VSC and the other for a three-level MMC topology. During normal operating conditions, PQ control was applied, and at t=0.1 s, a DC fault at the mid-point of the DC cable was initiated. For each model, the four different DC protection schemes were tested sequentially (DC protection with ACCBs only, STSS, DTSS, and the present system).

Figure 9A:
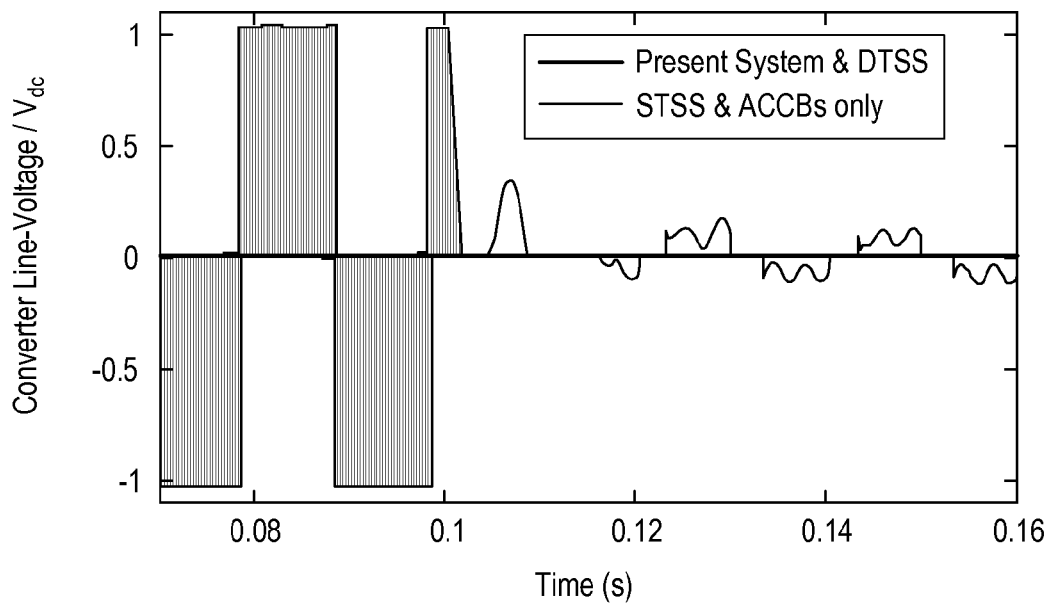
FIG. 9A is a graph showing a converter line voltage for a simulated VSC, comparing the present DC side fault isolator for HVDC converters against DTSS, STSS, and a protection scheme using ACCBs only.
Figure 9B:
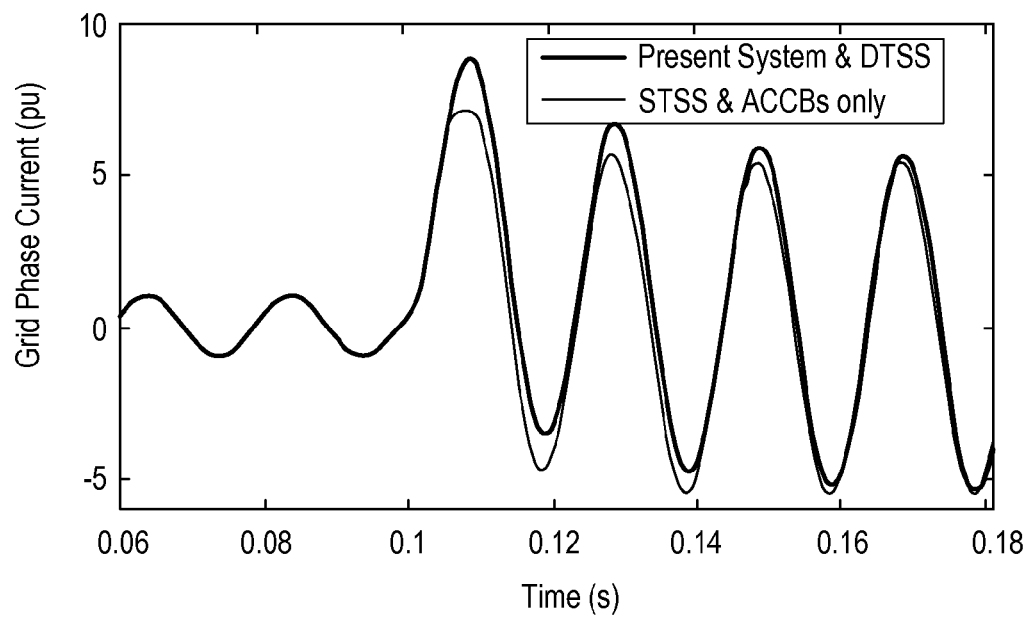
FIG. 9B is a graph showing grid phase current for a simulated VSC, comparing the present DC side fault isolator for HVDC converters against DTSS, STSS, and a protection scheme using ACCBs only.
Figure 9C:
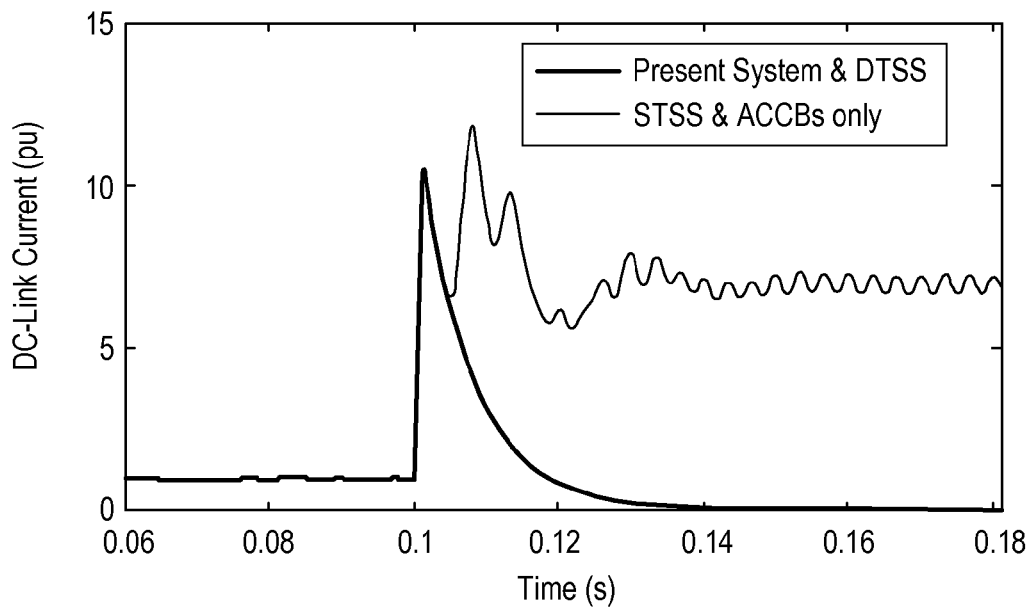
FIG. 9C is a graph showing DC-link current for a simulated VSC, comparing the present DC side fault isolator for HVDC converters against DTSS, STSS, and a protection scheme using ACCBs only.
Figure 9D:
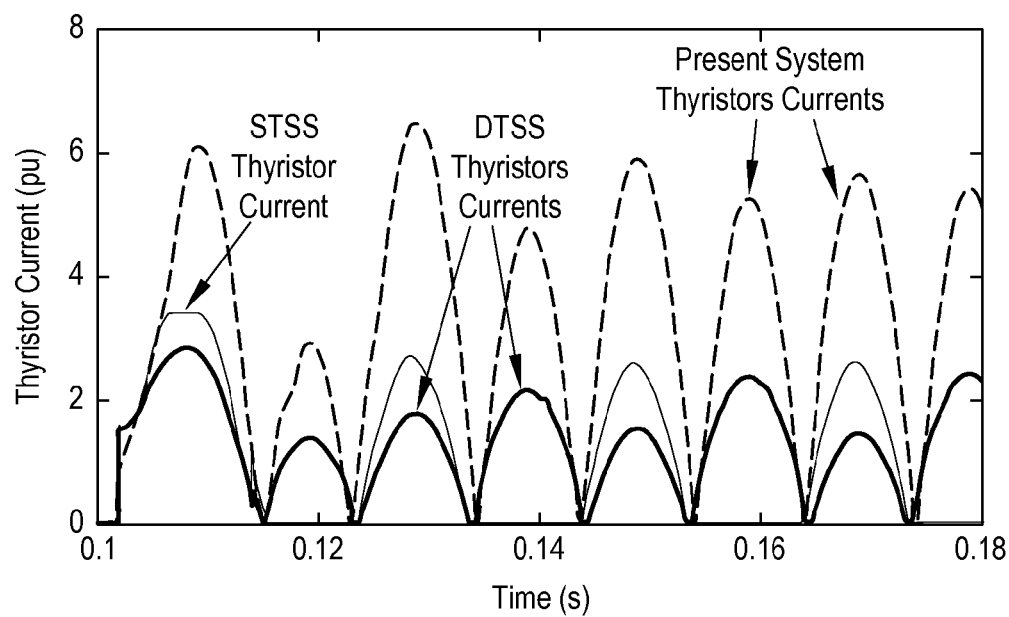
FIG. 9D is a graph showing thyristor currents for a simulated VSC during a DC fault, comparing the present DC side fault isolator for HVDC converters against DTSS, and STSS.
Figure 9E:
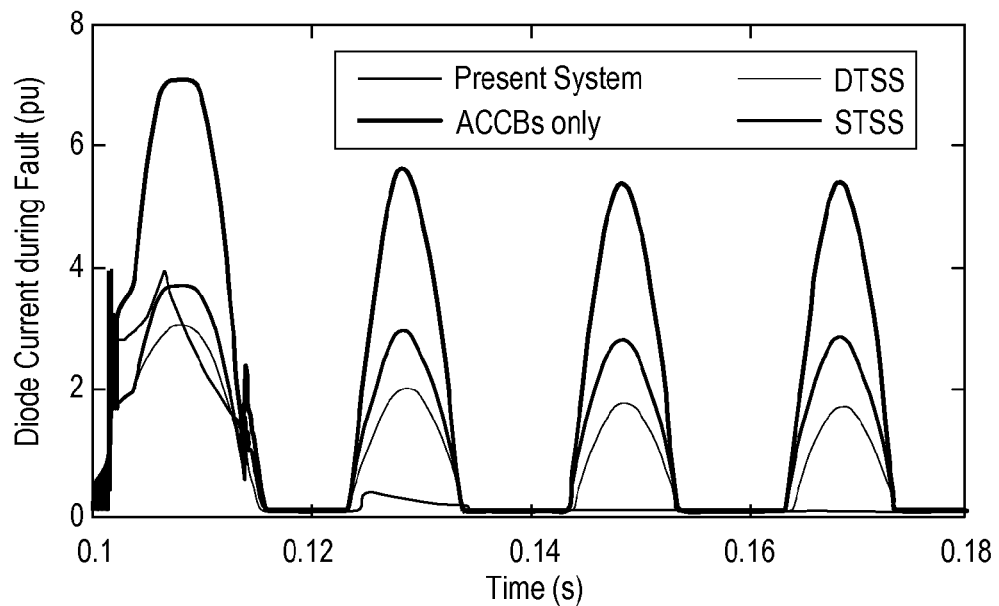
FIG. 9E is a graph showing diode current during a DC fault for a simulated VSC, comparing the present DC side fault isolator for HVDC converters against DTSS, STSS, and a protection scheme using ACCBs only.
Figure 9F:
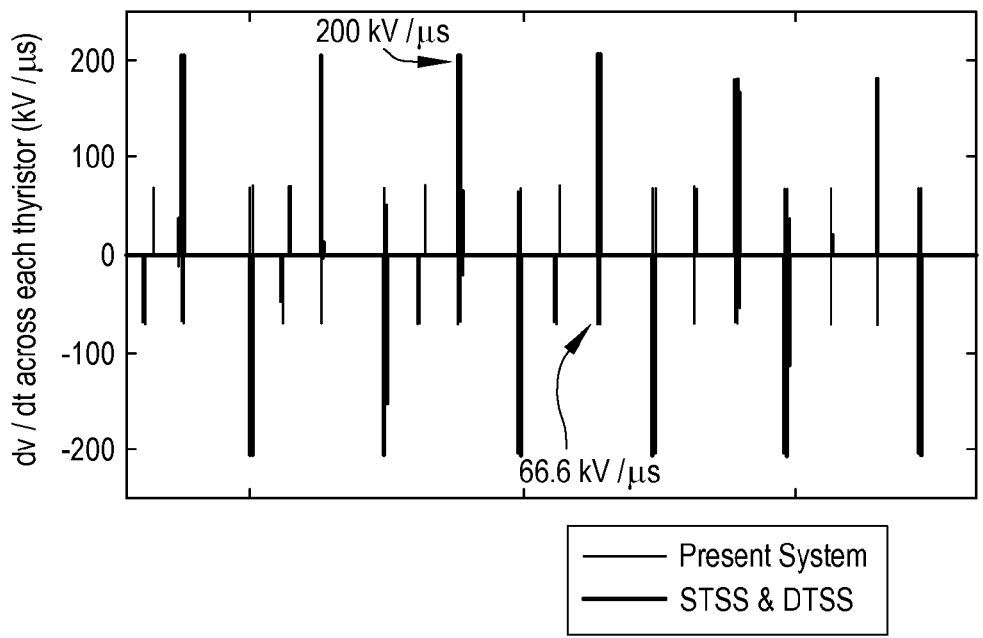
FIG. 9F is a graph showing dv/dt across each thyristor for a simulated VSC, comparing the present DC side fault isolator for HVDC converters against DTSS and STSS during normal operating conditions.
Figure 10A:
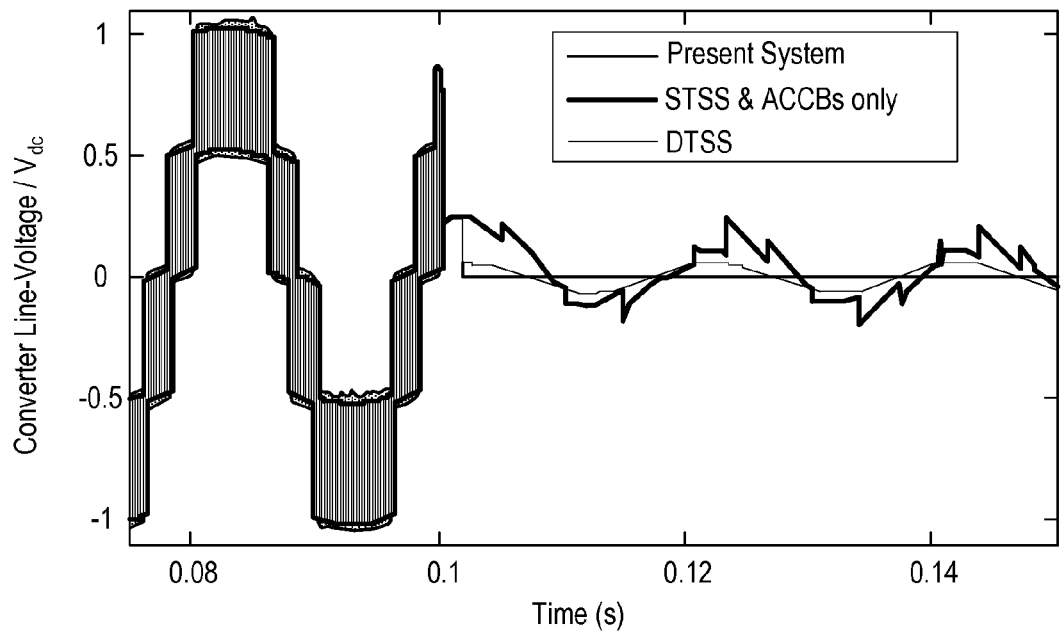
FIG. 10A is a graph showing converter line voltage for a simulated three-level MMC, comparing the present DC side fault isolator for HVDC converters against DTSS, STSS, and a protection scheme using ACCBs only.
Figure 10B:
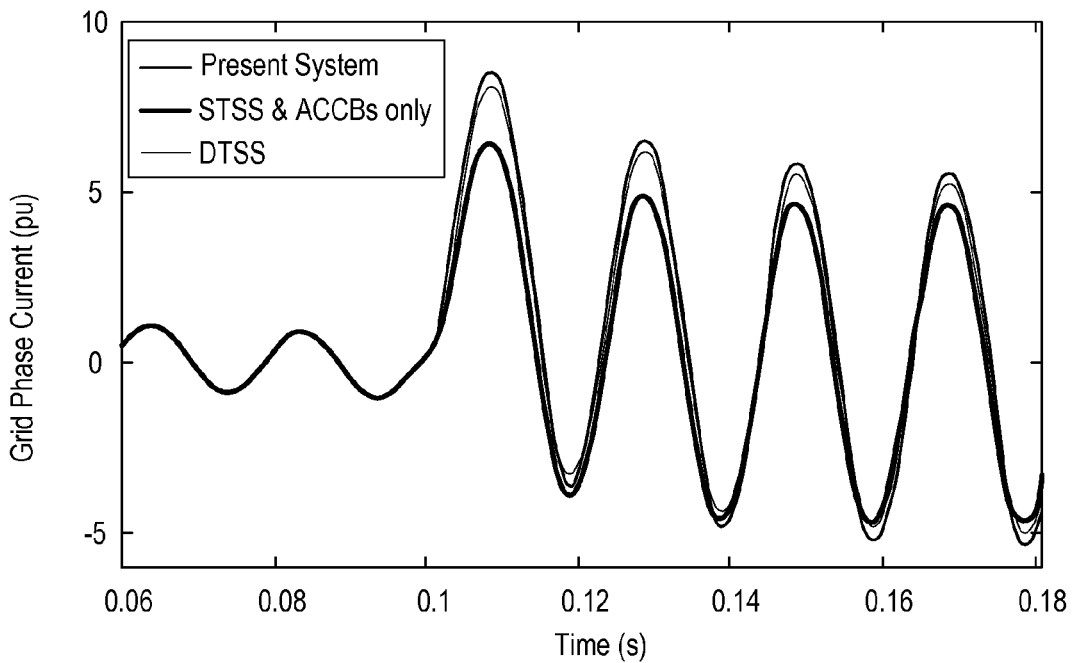
FIG. 10B is a graph showing grid phase current for a simulated three-level MMC, comparing the present DC side fault isolator for HVDC converters against DTSS, STSS, and a protection scheme using ACCBs only.

The corresponding simulation results for VSC and MMC topologies are shown in FIGS. 9A-F and FIGS. 10A-F, respectively. FIGS. 9A and 10A show the converter line voltage during normal operation and a DC side fault. In the present system, the line voltage is forced to zero in order to provide full segregation between the AC and DC sides. FIG. 9B shows the effect of a DC side fault on the AC current with different protection schemes. It is clear that the present system does not affect the steady state magnitude of AC current during a DC fault. On the other hand, the AC current is slightly affected in the MMC topology (FIG. 10B) because the arm inductors are discarded with the present topology.

TABLE 1

Parameters of the HVDC System Model

| AC Side | |
|---|---|
| Rated (Base) Power | 450 MVA |
| Grid phase voltage | 100 kV (peak) |
| Rated (Base) AC phase current | 3000 A (peak) |
| Three-phase transformer ratio | 1:1 |
| Active power reference | 430 MW |
| Reactive power reference | −100 MVAR |
| Transformer resistance | 1 Ω |
| Transformer reactance | 6 Ω |
| DC Side | |
| Rated (Base) DC voltage $V_{dc}$ | 200 kV |
| Rated (Base) DC current | 2250 A |
| DC cable length | 150 km |
| DC cable resistance | 14 mΩ/km |
| DC cable inductance | 0.1 mH/km |
| VSC | |
| DC-link capacitor | 100 µF |
| MMC | |
| Arm inductor $L_0$ | 3 mH |

Figure 10C:
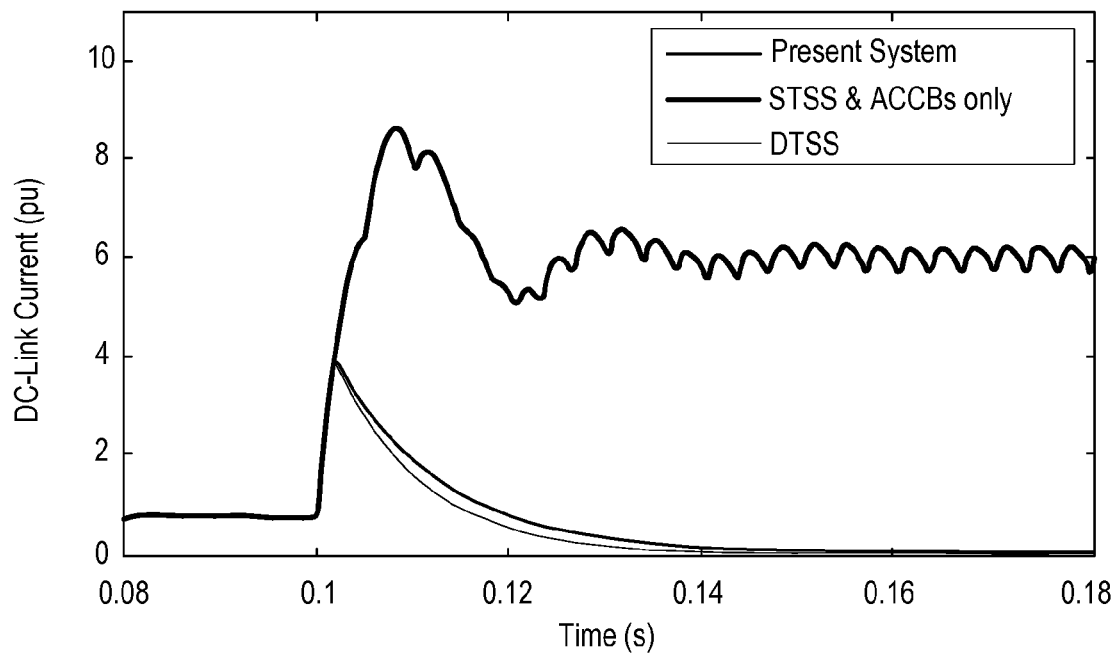
FIG. 10C is a graph showing DC-link current for a simulated three-level MMC, comparing the present DC side fault isolator for HVDC converters against DTSS, STSS, and a protection scheme using ACCBs only.
Figure 10D:
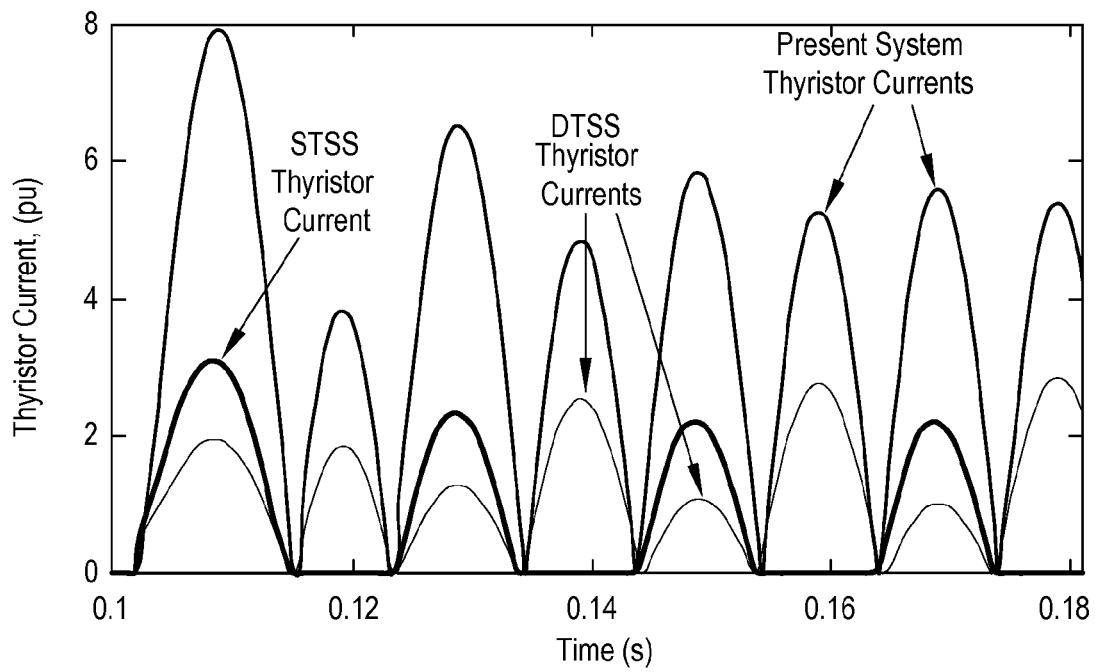
FIG. 10D is a graph showing thyristor currents for a simulated three-level MMC, comparing the present DC side fault isolator for HVDC converters against DTSS, and STSS.
Figure 10E:
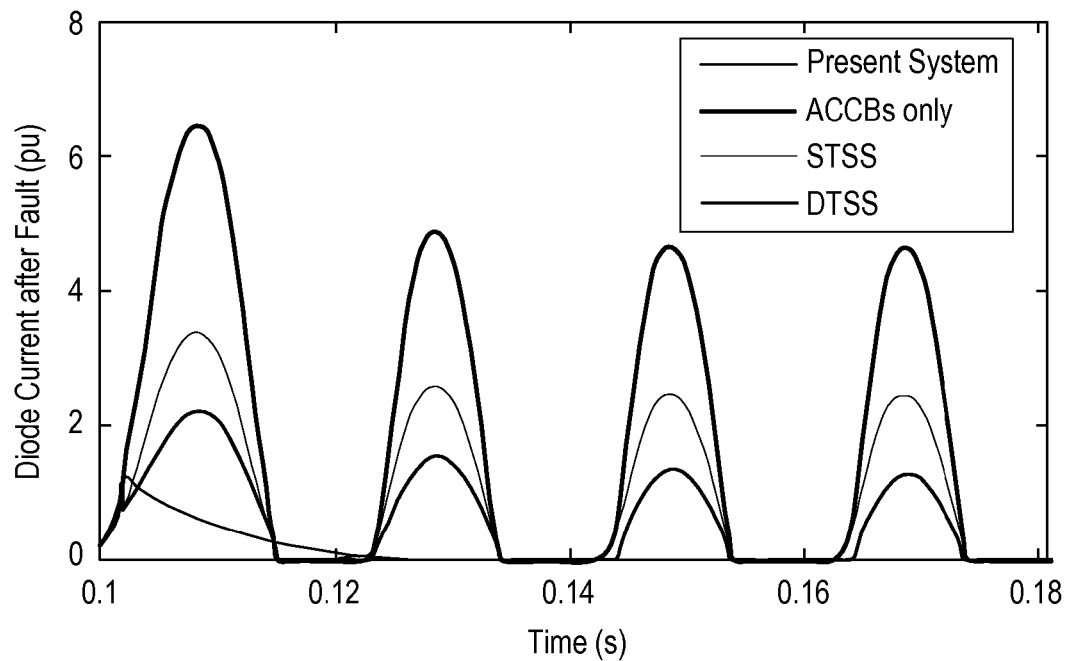
FIG. 10E is a graph showing diode current after a DC fault for a simulated three-level MMC, comparing the present DC side fault isolator for HVDC converters against DTSS, STSS, and a protection scheme using ACCBs only.
Figure 10F:
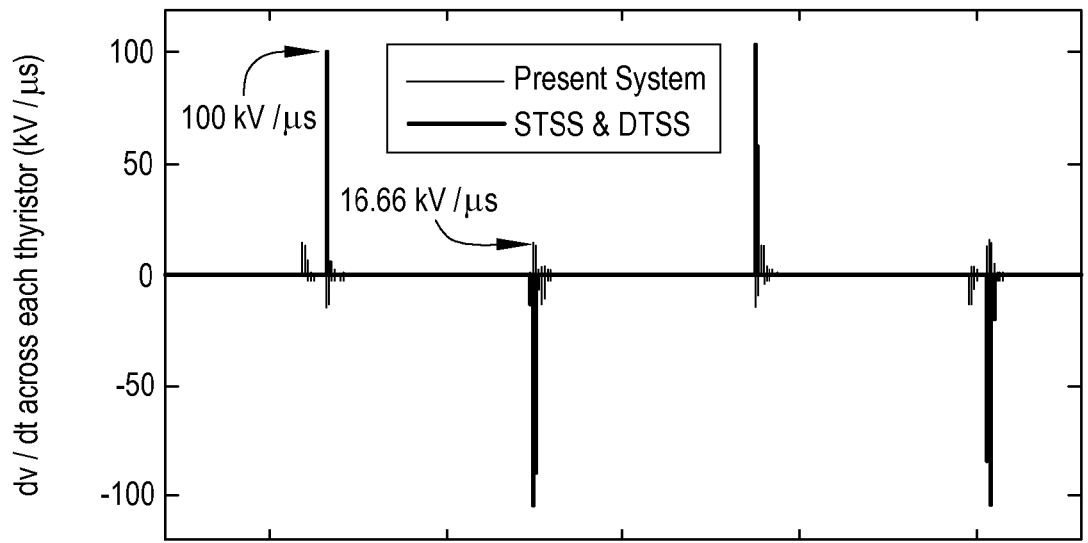
FIG. 10F is a graph showing dv/dt across each thyristor for a simulated three-level MMC, comparing the present DC side fault isolator for HVDC converters against DTSS and STSS during normal operating conditions.

The DC-link currents of the VSC and MMC are shown in FIG. 9C and 10C, respectively. DTSS and the present system provide no grid contribution and the DC current decays freely to zero. As a result, a simple DC switch typically will be sufficient for disconnecting the cable from the converter DC terminals to start localizing and clearing the fault. For DC protection with STSS and ACCBs only, the grid current contribution to the DC fault is clearly shown in the same figures with a value equal to the summation of the positive three-phase fault currents. to FIG. 9D and 10D show the thyristor currents for the VSC and MMC, respectively. As expected, the thyristor currents are higher in the present system because they carry the full current and do not share it with diodes, as in STSS or DTSS. FIGS. 9E and 10E show the diode currents for the VSC and MMC, respectively. The steady state diode currents are zero in the present system; i.e. it provides complete segregation of the converter and its semiconductor switches. FIGS. 9F and 10F show that with the present system, the dv/dt stresses are reduced by 66.66% and 83.33% for VSC and MMC systems, respectively, compared to other protection schemes, for example, thus corroborating the relations given above.

It is to be understood that the present invention is not limited to the embodiments described above, but encompasses any and all embodiments within the scope of the following claims.

We claim:

1. A direct current side fault isolator for high voltage direct current converters, comprising:
   a first set of double thyristor switches connected across line-to-line voltage terminals, between first and second phases of alternating current terminals of a high voltage direct current converter; and
   a second set of double thyristor switches connected across the line-to-line voltage terminals, between the second phase and a third phase of the alternating current terminals of the high voltage direct current converter, whereby said first and second sets of double thyristor switches separate the high voltage direct current converter from an external power grid during direct current side faults.

2. The direct current side fault isolator for high voltage direct current converters as recited in claim 1, wherein the high voltage direct current converter is a two-level voltage-source converter, said first and second sets of double thyristor switches each comprising three double thyristor switches.

3. The direct current side fault isolator for high voltage direct current converters as recited in claim 2, wherein each said double thyristor switch comprises a pair of thyristors connected in inverse-parallel.

4. The direct current side fault isolator for high voltage direct current converters as recited in claim 3, wherein the three double thyristor switches of each of said first and second sets of double thyristor switches are connected in series.

5. The direct current side fault isolator for high voltage direct current converters as recited in claim 1, wherein the high voltage direct current converter is a half-bridge modular multilevel converter, said first and second sets of double thyristor switches each comprising 3n double thyristor switches, wherein n is a number of sub-modules per arm of the half-bridge modular multilevel converter.

6. The direct current side fault isolator for high voltage direct current converters as recited in claim 5, wherein each said double thyristor switch comprises a pair of thyristors connected in inverse-parallel.

7. The direct current side fault isolator for high voltage direct current converters as recited in claim 6, wherein the 3n double thyristor switches of each of said first and second sets of double thyristor switches are connected in series.

8. A direct current side fault isolator for high voltage direct current converters, to comprising:

a first set of double thyristor switches connected across line-to-line voltage terminals, between first and second phases of alternating current terminals of a high voltage direct current converter, the high voltage direct current converter being a two-level voltage-source converter; and a second set of double thyristor switches connected across the line-to-line voltage terminals, between the second phase and a third phase of the alternating current terminals of the high voltage direct current converter, whereby said first and second sets of double thyristor switches separate the high voltage direct current converter from an external power grid during direct current side faults.

9. The direct current side fault isolator for high voltage direct current converters as recited in claim 8, wherein said first and second sets of double thyristor switches each comprise three double thyristor switches.

10. The direct current side fault isolator for high voltage direct current converters as recited in claim 9, wherein each said double thyristor switch comprises a pair of thyristors connected in inverse-parallel.

11. The direct current side fault isolator for high voltage direct current converters as recited in claim 10, wherein the three double thyristor switches of each of said first and second sets of double thyristor switches are connected in series.

12. A direct current side fault isolator for high voltage direct current converters, comprising:

a first set of double thyristor switches connected across line-to-line voltage terminals, between first and second phases of alternating current terminals of a high voltage direct current converter, the high voltage direct current converter being a half-bridge modular multilevel converter; and a second set of double thyristor switches connected across the line-to-line voltage terminals, between the second phase and a third phase of the alternating current terminals of the high voltage direct current converter, whereby said first and second sets of double thyristor switches separate the high voltage direct current converter from an external power grid during direct current side faults.

13. The direct current side fault isolator for high voltage direct current converters as recited in claim 12, wherein said first and second sets of double thyristor switches each comprise 3n double thyristor switches, wherein n is a number of sub-modules per arm of the half-bridge modular multilevel converter.

14. The direct current side fault isolator for high voltage direct current converters as recited in claim 13, wherein each said double thyristor switch comprises a pair of thyristors connected in inverse-parallel.

15. The direct current side fault isolator for high voltage direct current converters as recited in claim 14, wherein the 3n double thyristor switches of each of said first and second sets of double thyristor switches are connected in series.

* * * * *